Jan. 29, 1963   R. C. GIESSE   3,075,646
FILTER
Filed Oct. 1, 1959
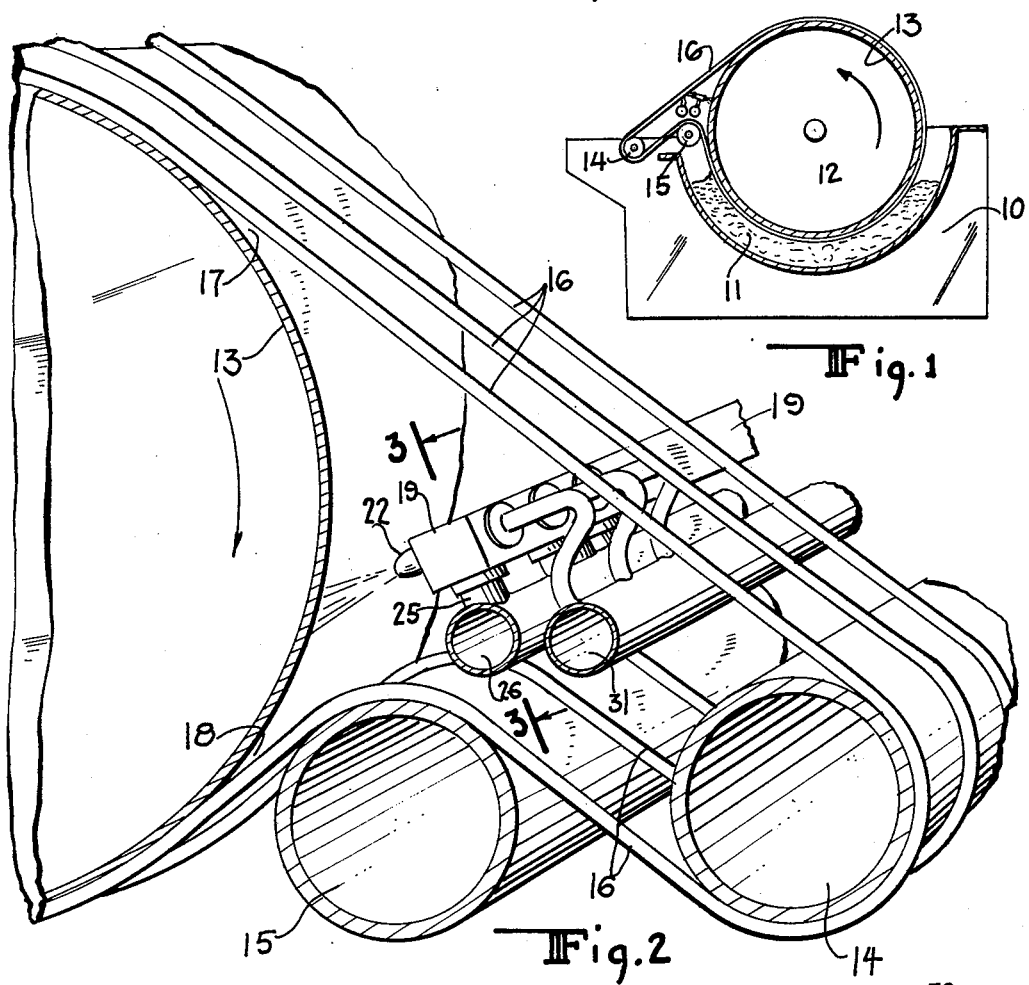
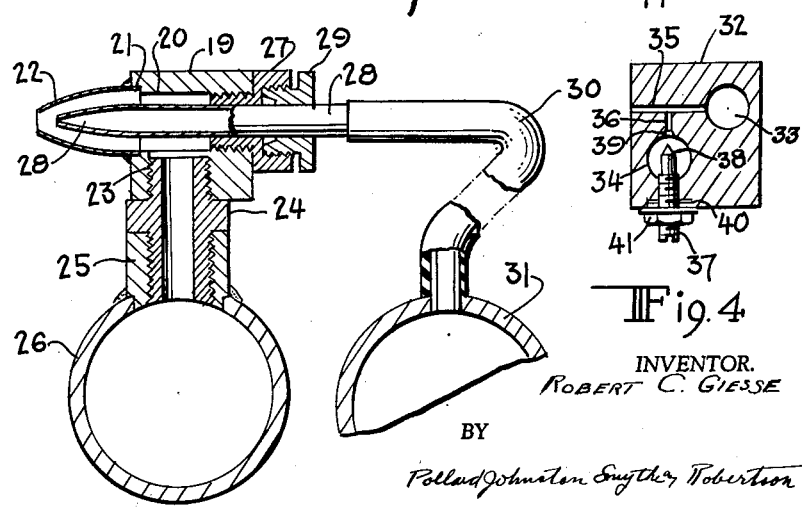
INVENTOR.
ROBERT C. GIESSE
BY
ATTORNEYS

United States Patent Office 3,075,646
Patented Jan. 29, 1963

3,075,646
FILTER
Robert C. Giesse, Bettendorf, Iowa, assignor to Ametek, Inc., a corporation of Delaware
Filed Oct. 1, 1959, Ser. No. 843,775
1 Claim. (Cl. 210—391)

The present invention relates to drum type filters employing strings or scrapers to remove the cake therefrom, and particularly to such filters in combination with a new and improved device for cleaning the surface of the drum after the cake has been removed therefrom and before it re-enters the slurry being filtered.

Drum filters usually comprise a cylindrical drum mounted for rotation about a horizontal axis and include shallow, axially extending compartments, each connected to a suction line. Woven wire drainage members may cover the shallow compartments and cloth covers the screen members. In drum type string filters, axially spaced (in the order of about one-half inch), circumferentially extending strings surround substantially the entire drum periphery except at a cake discharge point where the strings leave the drum periphery, pass around spaced idler rolls and return to the drum periphery.

The function of the strings at the cake discharge location is to remove the filter cake from the cloth surrounding the drum. While such action is effective, it has been found that the efficiency of the filter can be enhanced if the cloth, in both string and scraper type filters, is suitably cleaned after the cake is removed and prior to its passing through the slurry being filtered. Filter cloths of drum filters frequently "blind" over a period of time with consequent reduction in their effectiveness. Normal practice is to shut down and clean the cloth. Loss of production is always undesirable and frequently the "blinded" cloth is very difficult to clean as the result of the accumulation of slimes, often making it impossible to restore original operating rates of filtration.

Continuous cleaning of the cloth is usually effective in retaining the desired operating condition. However, straight liquid (single fluid) atomization requires relatively large and objectionable quantities of liquid and the high atomization pressures necessary for adequate velocity result in excessive cloth deterioration.

An important object of this invention is to provide a string or scraper type filter with a cloth cleaning device capable of cleansing the cloth after the cake has been removed therefrom and prior to the cloth re-entering the slurry being filtered.

Another object of this invention is to provide such a cleaning device that will provide a maximum cleaning action without abrading the cloth.

Another object of this invention is to provide such a cleaning device utilizing a spray of water and air in which a minimum amount of water is required.

Another object of this invention is to provide such a cleaning device for string and scraper filters in which the water is rapidly broken up into very fine water particles to which a high velocity is imparted by an air stream.

Another object of this invention is to provide such a string or scraper filter and cloth cleaning device in which an area of the cloth at the point where the scraper is located or between the points where the strings leave and return to the drum of the filter, and which area extends from one side of said drum to the other, is simultaneously subjected to the action of a mass of high velocity, fine particles of water.

In one aspect of the invention, a manifold may be supported along a longitudinal axis parallel with the longitudinal axis of the drum of a string or scraper filter, spaced from the periphery of the drum and located under the scraper blade or between the strings as they leave and return to the drum at the point of filter cake discharge.

In another aspect of the invention, individual, axially spaced nozzles may be formed in the manifold and directed toward the cloth on the periphery of the drum. The nozzles may have individual leaders extending from them to a common header in which water is maintained under a predetermined pressure.

In still another aspect of the invention, individual, coaxial nozzles may extend into the manifold nozzles forming an annular passage between the two in communication with the leaders extending from the water header. The coaxial nozzles may have individual leaders extending from them to an air header for supplying each with a supply of air under a predetermined pressure.

In still another aspect of the invention, adjusting means may be provided between the coaxial and manifold nozzles to vary the effect of the high pressure air stream on the water from the water header in order to direct a mass of high velocity, minute water particles onto the cloth surrounding the drum of a string or scraper filter.

In another aspect of the invention, a piece of bar stock or the like may have longitudinally extending parallel, spaced passages at different elevations extending therethrough. Right angular jet passages may extend from each of the parallel passages in a manner to intersect each other.

In another aspect of the invention, adjustable valve means may cooperate with the jet passages leading from one of the parallel passages for controlling the flow of a liquid therethrough. Air under pressure may be supplied to the other parallel passage.

The construction and arrangement of the passages are such that liquid is forced at right angles, in small droplet quantities, into a high velocity air stream within the device. This causes the breaking up of the liquid droplets into very fine liquid particles which are subjected to the high velocity of the air stream. In this way the atomization action of a second fluid, e.g., compressed air, generates a series of high velocity streams of very fine liquid particles that effectively remove loose or lightly held particles without damage of any kind to the cloth and at greatly reduced liquid rates.

The above, other objects and novel features of the invention will become apparent from the following specification and accompanying drawing which is merely exemplary.

In the drawing:

FIG. 1 is a transverse sectional elevation of a string filter to which the principles of the invention have been applied;

FIG. 2 is an enlarged perspective view of a portion of the apparatus shown in FIG. 1;

FIG. 3 is a sectional view taken substantially along line 3—3 of FIG. 2; and

FIG. 4 is a cross-sectional view of a modified form of the atomizing device shown in FIG. 3.

Referring to the drawing, and particularly to FIGS. 1 and 2, the principles of the invention are shown as applied to a string filter including a housing 10 adapted to contain a slurry 11 to be filtered. The housing 10 may have bearings (not shown) at each end thereof for rotatably supporting a shaft 12 to which a hollow drum 13 is rigidly attached by spiders in a known manner.

The drum 13 may be made up of individual, shallow compartments, each of which may be connected to a suction line leading to a filtering outlet. The outer periphery of the drum 13 may be covered with screening which latter may be covered with a thin fabric on which the filter cake forms, all as is well known in the art.

The housing 10 is adapted to support idler rollers 14 and 15 arranged along spaced axes parallel with the longitudinal axis of shaft 12. Individual endless strings 16 surround the major portion of the periphery of the drum 13 in contact with the fabric covering and leave the drum 13 at the point 17, extend over the idler rollers 14 and 15 and return to the drum 13 at the point 18. The number of individual endless strings may vary within wide limits and generally may be axially spaced in the order of about one-half inch or less.

In operation, the slurry within the housing submerges a major portion of the half of drum 13 below the shaft 12, and the individual compartments about its periphery are subjected to suction while they are within the slurry 11, thereby forming a filter cake on the outer surface of the cloth and on top of the strings 16. As the strings 16 leave the drum 13 at point 17, the filter cake is pryed off of the cloth and discharges from the idler roll 14 into a hopper (not shown).

Referring to FIG. 2, a manifold 19 may be supported between the upper and lower reaches of the strings 16 between the points 17 and 18. The manifold 19 may be arranged along a longitudinal axis parallel with the axis of shaft 12 and radially spaced outwardly from the periphery of drum 13.

The manifold 19 may be made from bar stock of rectangular cross section and may have a plurality of passages 20 drilled therethrough along parallel spaced axes lying within a plane angularly disposed relatively to the periphery of drum 13. The number of passages 20 may vary within wide limits and should be such that adequate coverage of the full length of drum 13 is provided. Each passage 20 may be counterbored at 21 to receive a nozzle 22 that may be fixed in sealing relation to its corresponding passage 20. Each passage 20 may also be intersected by a right angular, threaded passage 23. Each threaded passage 23 may have a connector 24 threaded thereinto, which connector is also threaded or otherwise connected to a hollow boss 25 leading to the interior of a header 26.

The end of passage 20 opposite that to which nozzle 22 is attached may be threaded to receive a gland 27 adapted adjustably to support a nozzle 28 that is coaxial with the nozzle 22. A packing gland 29 may be threaded into the rear end of the gland 27 for providing a seal between the nozzle 28 and the gland 27.

There may be a coaxial nozzle for each nozzle 22 and each coaxial nozzle may include a leader 30 that communicates with a header 31. The header 31 may extend along a line parallel with the longitudinal axis of header 26 for supplying all of the coaxial nozzles 28.

Water under a predetermined pressure may be maintained within the header 26, and air under a predetermined pressure may be maintained in the header 31.

The construction and arrangement of the parts are such that a high velocity air stream is directed axially through the outlets of manifold nozzles 22 from the air nozzles 28, and the water within the annular space between the manifold and air nozzles must move at substantially right angles to, and into this stream. It can be theorized that droplets of water having substantially the diameter of the outlet of nozzles 22 are continuously subjected to the shearing action of the high velocity air stream, causing them to be broken into very fine particles which have imparted to them the high velocity of the air stream issuing from nozzles 28. This produces a mass of finely divided particles of water moving at a high velocity which, when directed over the entire surface of an axially extending band on the surface of drum 13, produces a superior cleaning of the cloth surrounding the drum of the string filter without abrading the fabric cloth. By employing the energy of the air jet to shear or break up the water droplets into minute particles rather than the energy in the water, the water required is minimized, thereby lessening the tendency to dilute the slurry being filtered.

Referring to FIG. 4, a modified form of atomizing device is shown. It may comprise a manifold made from a piece of bar stock 32 having two parallel spaced passages 33 and 34 drilled therethrough. The passages 33 and 34 may be at different elevations, and air under a predetermined pressure may be supplied to passage 33, while water at a predetermined pressure may be supplied to passage 34.

Relatively small passages 35 may be drilled through one side of the manifold 32, leading from the passage 33 to atmosphere. There may be any number of these passages 35 spaced along the manifold 32 depending upon the use to which the atomizer is put.

A corresponding, relatively small passage 36 may be drilled transversely through the manifold 32 for each of the passages 35 and in a manner to provide communication between the passage 34 and each of the passages 35. The passages 36 are preferably at right angles to the passages 35. Each of the passages 36 may be counterbored and threaded to receive an adjusting screw 37 having a conical end 38, for cooperation with a seat 39 formed at the juncture of passages 36 and passage 34. Sealing washers 40 may be employed to prevent leakage around the screw 37, and a lock nut 41 may be employed to lock the screw 37 in adjusted position.

With air under a predetermined pressure supplied to passage 33, high velocity jets of air issue from the exhaust end of passages 35. Upon supplying a liquid such as water to the passage 34 under a predetermined pressure, it can be theorized that a continuous supply of droplets of water having substantially the diameter of passages 35 is subjected to the shearing action of the high velocity jets of air within passages 35. This action is believed to break up the water droplets into very fine particles of water due to the shearing action of the air jet in passages 35. Additionally, these small particles of water have imparted to them a velocity substantially equal to that of the jet of air within the passages 35, resulting in a mass of finely divided particles of water having a high velocity issuing from the atomizing manifold 32.

Although the various features of the new and improved cleaning device for string or scraper filters have been shown and described in detail to fully disclose two embodiments of the invention, it will be evident that changes may be made in such details and certain features may be used without others without departing from the principles of the invention.

What is claimed is:

In a drum filter having a fabric cloth covered drum adapted to be rotated about a horizontal axis and including means for removing filter cake from said drum; means for cleaning said fabric cloth after the filter cake has been removed from it and prior to its being immersed in slurry being filtered, said cleaning means comprising an atomizing manifold block arranged longitudinally of and substantially parallel to the axis of said drum, said manifold being located beneath the filter cake removing means and having a plurality of longitudinally spaced outlets disposed adjacent said drum cloth, a longitudinally extending air passage within said manifold for directing a high velocity air stream to said outlets, a plurality of transverse passages each communicatively connecting said air passage with a corresponding outlet, a longitudinally extending water passage within said manifold and arranged in parallelism with said air passage for supplying water droplets to said transverse passages, and a plurality of passages communicatively connecting said water passage with the corresponding transverse passages intermediate their respective lengths and at right angles thereto, whereby a high velocity air stream may be introduced into said transverse passages for breaking water droplets fed perpendicularly to each stream into fine water particles having a high velocity imparted thereto.

(References on following page)

References Cited in the file of this patent

UNITED STATES PATENTS

| | | |
|---|---|---|
| 229,744 | Otis | July 6, 1880 |
| 1,939,836 | Tolfree | Dec. 19, 1933 |
| 2,027,652 | Raisch | Jan. 14, 1936 |
| 2,060,896 | Raisch | Nov. 17, 1936 |
| 2,229,582 | Merrill | Jan. 21, 1941 |
| 2,247,460 | Wright | July 1, 1941 |
| 2,403,021 | Peterson et al. | July 2, 1946 |
| 2,426,886 | Komline | Sept. 2, 1947 |
| 2,551,538 | Hensel | May 1, 1951 |
| 2,598,304 | Richardson | May 27, 1952 |
| 2,802,475 | Stine | Aug. 13, 1957 |
| 2,839,194 | Lopker et al. | June 17, 1958 |